(12) United States Patent
Yuta et al.

(10) Patent No.: US 7,997,596 B2
(45) Date of Patent: Aug. 16, 2011

(54) ACTUATOR FOR VEHICLE

(75) Inventors: Atsushi Yuta, Wako (JP); Kotaro Yamaguchi, Wako (JP); Masanori Watanabe, Wako (JP); Takehiko Hakui, Wako (JP); Hajime Kajiwara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 91 days.

(21) Appl. No.: 12/449,939

(22) PCT Filed: Mar. 12, 2008

(86) PCT No.: PCT/JP2008/054490
§ 371 (c)(1),
(2), (4) Date: Sep. 3, 2009

(87) PCT Pub. No.: WO2008/114659
PCT Pub. Date: Sep. 25, 2008

(65) Prior Publication Data
US 2010/0019465 A1    Jan. 28, 2010

(30) Foreign Application Priority Data

Mar. 16, 2007 (JP) ................ 2007-069067

(51) Int. Cl.
*B62D 7/20* (2006.01)
*B62D 17/00* (2006.01)
*B60G 17/015* (2006.01)
(52) U.S. Cl. ............. 280/86.758; 280/5.52; 280/5.522
(58) Field of Classification Search ........... 74/89.23, 74/89.4, 89.41, 89.34, 25; 188/129, 134; 280/5.52, 5.521, 5.522, 86.75, 86.751, 86.755, 280/86.757, 86.758; 310/75 R, 80, 83
See application file for complete search history.

(56) References Cited

U.S. PATENT DOCUMENTS
4,679,451 A * 7/1987 Nakamura ............... 74/606 R
(Continued)

FOREIGN PATENT DOCUMENTS
DE    10 2005 018 308 A1    11/2006
(Continued)

OTHER PUBLICATIONS

Machine Translation of DE 10 2005 023250 A1 (cited by Applicant).*
Machine Translation of JP 2007-1364 (cited by Applicant).*

*Primary Examiner* — Eric Culbreth
*Assistant Examiner* — Joseph Rocca
(74) *Attorney, Agent, or Firm* — Carrier Blackman & Associates, P.C.; William D. Blackman; Joseph P. Carrier

(57) ABSTRACT

Left and right actuators (14) for a vehicle are provided that include a first housing (31) and a second housing (32) connected in a direction of an axis (L), a coupling flange (31a) of the first housing (31) and a coupling flange (32a) of the second housing (32) being connected by a plurality of bolts (35) disposed at equal intervals on a circumference having the axis (L) as the center, and since a component mounting part via which a stroke sensor (102) is mounted on the second housing (32) is provided at an intermediate position between two bolts (35) of the plurality of bolts (35) or at a position of any one bolt (35), the stroke sensors (102) of the left and right actuators (14) can be disposed at positions that are mirror-symmetric relative to a central plane (P) of a vehicle body while reducing the number of components by using in common for each of the left and right actuators (14) the second housing (32) on which the stroke sensor (102) is mounted.

2 Claims, 9 Drawing Sheets

U.S. PATENT DOCUMENTS

| | | | |
|---|---|---|---|
| 4,763,219 A * | 8/1988 | Nakamura | 361/23 |
| 5,291,103 A * | 3/1994 | Ahmed et al. | 318/3 |
| 6,240,797 B1 * | 6/2001 | Morishima et al. | 74/89.39 |
| 6,386,553 B2 * | 5/2002 | Zetterstrom | 280/5.51 |
| 7,111,849 B2 * | 9/2006 | Yun | 280/5.52 |
| 7,156,191 B2 * | 1/2007 | Lau | 173/216 |
| 7,185,576 B2 * | 3/2007 | Heitzer | 91/375 A |
| 7,347,115 B2 * | 3/2008 | Otaki et al. | 74/89.38 |
| 7,438,154 B2 * | 10/2008 | Lim | 180/422 |
| 7,537,223 B2 * | 5/2009 | Zetterstroem | 280/86.75 |
| 7,766,350 B2 * | 8/2010 | Terada et al. | 280/86.757 |
| 2004/0124727 A1 * | 7/2004 | Lau | 310/83 |
| 2005/0067803 A1 | 3/2005 | Inayoshi et al. | |
| 2005/0155444 A1 | 7/2005 | Otaki et al. | |
| 2010/0066040 A1 * | 3/2010 | Suyama | 280/5.522 |

FOREIGN PATENT DOCUMENTS

| | | |
|---|---|---|
| DE | 10 2005 023 250 A1 | 11/2006 |
| JP | 62-125952 A | 6/1987 |
| JP | 8-337106 A | 12/1996 |
| JP | 2001-310751 | 11/2001 |
| JP | 2005-104225 A | 4/2005 |
| JP | 2005-170064 A | 6/2005 |
| JP | 2007-001364 A | 1/2007 |

* cited by examiner

ACTUATOR FOR VEHICLE

TECHNICAL FIELD

The present invention relates to an actuator for a vehicle that includes a right actuator disposed on a right-hand side of the vehicle and a left actuator disposed on a left-hand side of the vehicle, each of the actuators including a first housing and a second housing connected in a direction of an axis, and a coupling flange formed on a split face of the first housing and a coupling flange formed on a split face of the second housing being connected by a plurality of bolts disposed on a circumference having the axis as the center.

BACKGROUND ART

There is a system known from the following Patent Publication 1, in which an upper link and a lower link of a suspension device of a vehicle are controlled for expansion and contraction by an actuator, thereby inhibiting variations in camber angle and ground-contact tread with the bumping and rebounding of a wheel to enhance a stabilized steering performance, wherein the actuator is formed from a feed screw mechanism including an externally threaded member and an internally threaded member which are rotated relative to each other by a motor.
Patent Publication 1: Japanese Patent Publication No. 6-47388

DISCLOSURE OF INVENTION

Problems To Be Solved by the Invention

Such actuators are disposed symmetrically on left and right sides of a vehicle, but if a right-hand side actuator is used as a left-hand side actuator as it is, since the left and right actuators are not mirror-symmetric relative to the central plane of the vehicle body, the direction and position of a wiring brought out from the left and right actuators are left-right asymmetric, and there is thus the problem that the wiring interferes with another member or increases in length. In order to prevent this, a housing of the right-hand side actuator and a housing of the left-hand side actuator may be made as exclusive components that are not interchangeable, but by so doing the number of components (types of components) increases, thus causing an increase in cost.

The present invention has been accomplished in the light of the above-mentioned circumstances, and it is an object thereof to make it possible to use a common housing for each of two actuators disposed mirror-symmetrically on left and right sides of a vehicle, thus reducing the number of components.

Means for Solving the Problems

In order to attain the above object, according to a first aspect of the present invention, there is provided an actuator for a vehicle, comprising a right actuator disposed on a right-hand side of the vehicle and a left actuator disposed on a left-hand side of the vehicle, each of the actuators comprising a first housing and a second housing connected in a direction of an axis, and a coupling flange formed on a split face of the first housing and a coupling flange formed on a split face of the second housing being connected by a plurality of bolts disposed on a circumference having the axis as the center, characterized in that the plurality of bolts are disposed at equal intervals in the circumferential direction, and at least one of the first and second housings comprises a component mounting part having a component mounted thereon at an intermediate position between two bolts of the plurality of bolts or at a position of any one bolt.

According to a second aspect of the present invention, in addition to the first aspect, the left and right actuators are expandable actuators forming suspension arms of the vehicle, and a wiring of the component extends from the component inward in a vehicle width direction.

A toe control actuator 14 of an embodiment corresponds to the actuator of the present invention, and a stroke sensor 102 of the embodiment corresponds to the component of the present invention.

Effects of the Invention

In accordance with the first aspect of the present invention, with regard to the arrangement in which the left and right actuators of the vehicle include the first housing and the second housing connected in the axial direction, and the coupling flange formed on the split face of the first housing and the coupling flange formed on the split face of the second housing are connected by the plurality of bolts disposed on the circumference with the axis as the center, since the component mounting part via which the component is mounted on at least one of the first and second housings is provided at the intermediate position between two bolts among the plurality of bolts or at the position of any one bolt, while reducing the number of components by using in common the one housing on which the component is mounted for each of the left and right actuators, the components of the left and right actuators can be disposed at positions that are mirror-symmetric relative to the central plane of the vehicle body.

Furthermore, in accordance with the second aspect of the present invention, the left and right actuators are used as expandable actuators forming the suspension arms of the vehicle, and since in this arrangement the wiring of the component mounted on the one housing extends inward in the vehicle width direction, it is possible to carry out a wiring neatly without interfering with another member.

EXPLANATION OF REFERENCE NUMERALS AND SYMBOLS

14 Toe control actuator (actuator)
31 First housing
31*a* Coupling flange
32 Second housing
32*a* Coupling flange
35 Bolt 102 Stroke sensor (component)
111 Wiring
L Axis

BEST MODE FOR CARRYING OUT THE INVENTION

A mode for carrying out the present invention is explained below by reference to the attached drawings.

EMBODIMENT 1

FIG. 1 to FIG. 9 show a mode for carrying out the present invention.

Figure 1:
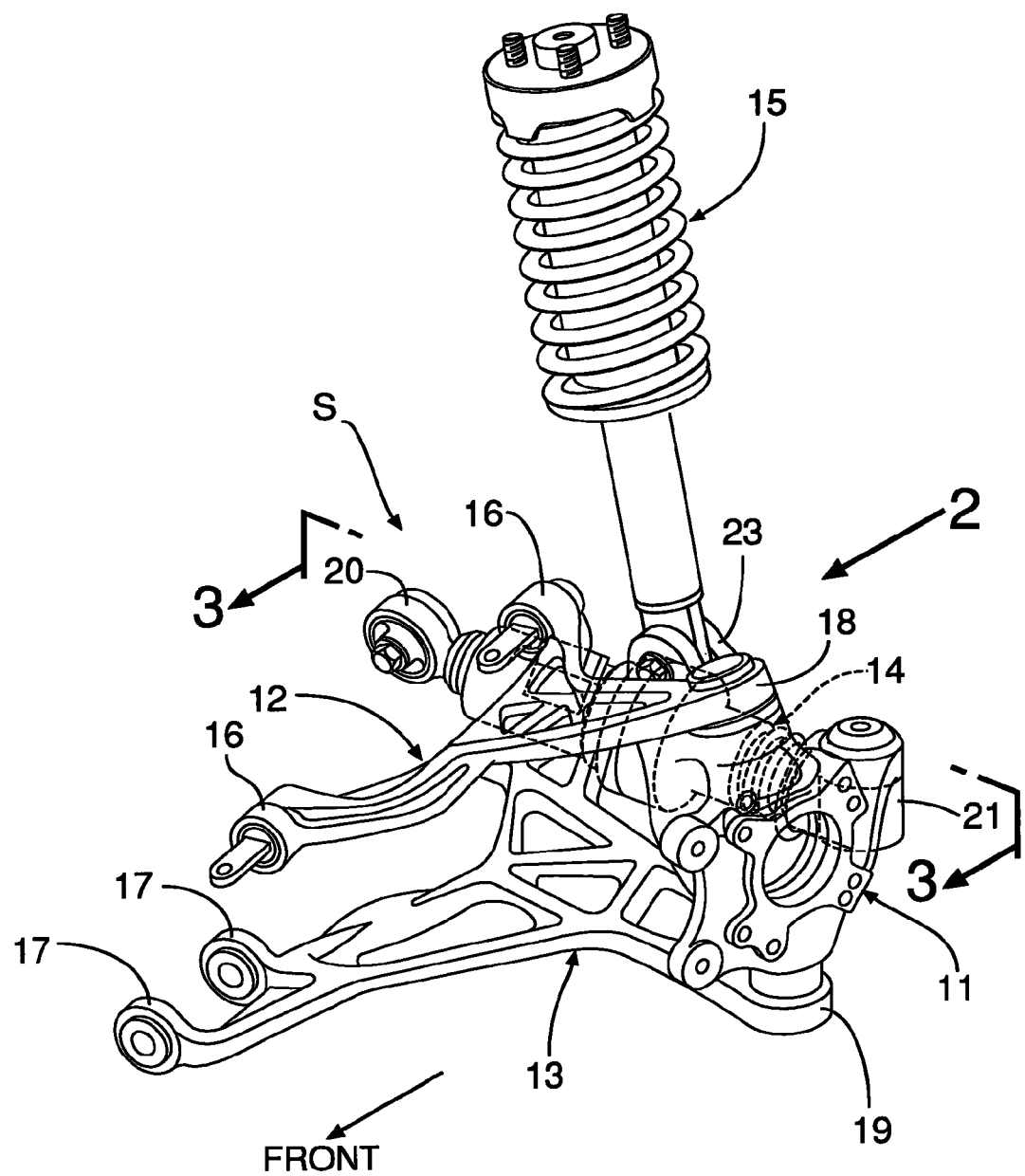
FIG. 1 is a perspective view of a suspension device for a left rear wheel (first embodiment).
Figure 2:
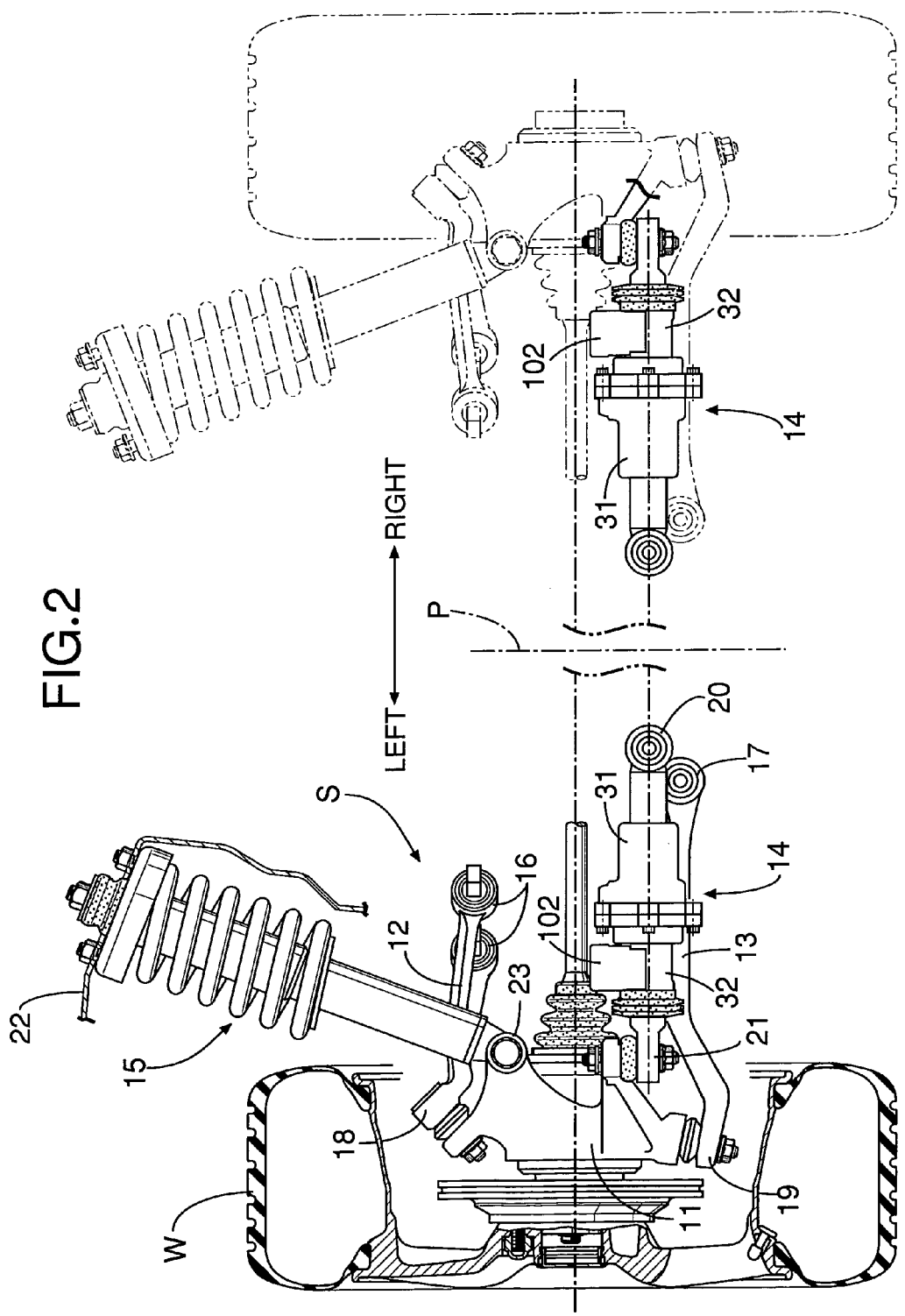
FIG. 2 is a view in the direction of arrow 2 in FIG. 1 (first embodiment).

As shown in FIGS. 1 and 2, a double wishbone-type rear suspension S of a four-wheel steering vehicle is formed from a knuckle 11 rotatably supporting a rear wheel W, an upper arm 12 and a lower arm 13 which connect the knuckle 11 to a vehicle body for vertical movement, a toe control actuator 14 which connects the knuckle 11 and the vehicle body to control a toe angle of the rear wheel W, a damper 15 having a suspension spring for damping the vertical movement of the rear wheel W, and the like.

Leading ends of the upper arm 12 and the lower arm 13 connected at their base ends to the vehicle body by rubber bush joints 16 and 17, respectively, are connected to upper and lower portions of the knuckle 11 through ball joints 18 and 19, respectively. The toe control actuator 14 is connected at its base end to the vehicle body through a rubber bush joint 20, and at its leading end to a rear portion of the knuckle 11 through a rubber bush joint 21. The damper 15 having the suspension spring and fixed at its upper end to the vehicle body (an upper wall 22 of a suspension tower) is connected at its lower end to the upper portion of the knuckle 11 through a rubber bush joint 23.

When the toe control actuator 14 is driven for expansion, the rear portion of the knuckle 11 is pushed outwards in a direction of a vehicle width, whereby the toe angle of the rear wheel W is changed in a toe-in direction. When the toe control actuator 14 is driven for contraction, the rear portion of the knuckle 11 is pulled inwards in the direction of the vehicle width, whereby the toe angle of the rear wheel W is changed in a toe-out direction. Therefore, it is possible to enhance the straight-travel stabilizing performance and the turning performance of the vehicle by controlling the toe angle of the rear wheel W in accordance with a vehicle speed and a steering angle of a steering wheel in addition to a usual steering of a front wheel by the operation of the steering wheel.

Next, with reference to FIGS. 3 to 8, the structure of the toe control actuator 14 will be described in detail.

Figure 3:
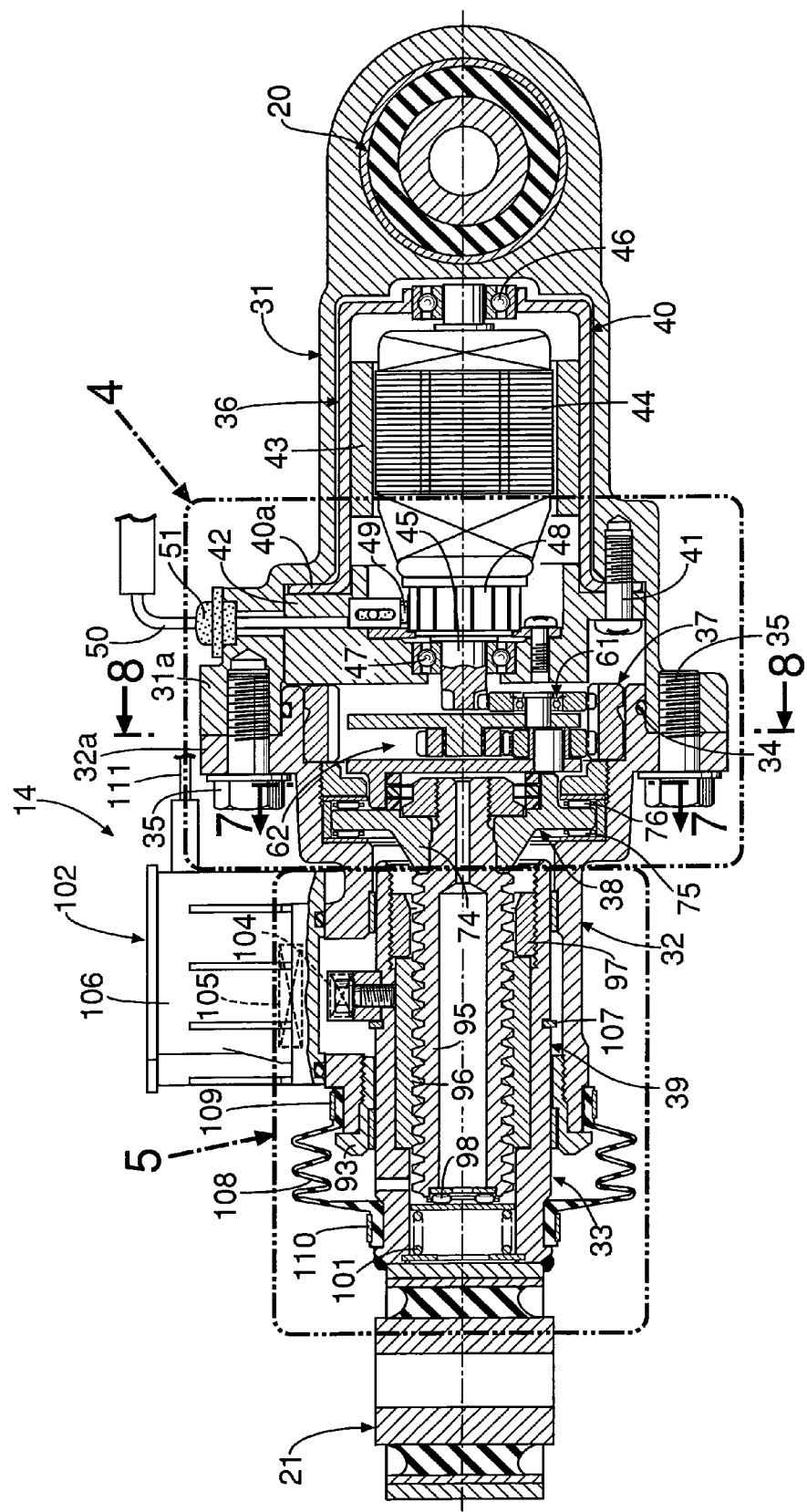
FIG. 3 is an enlarged sectional view along line 3-3 in FIG. 1 (first embodiment).
Figure 4:
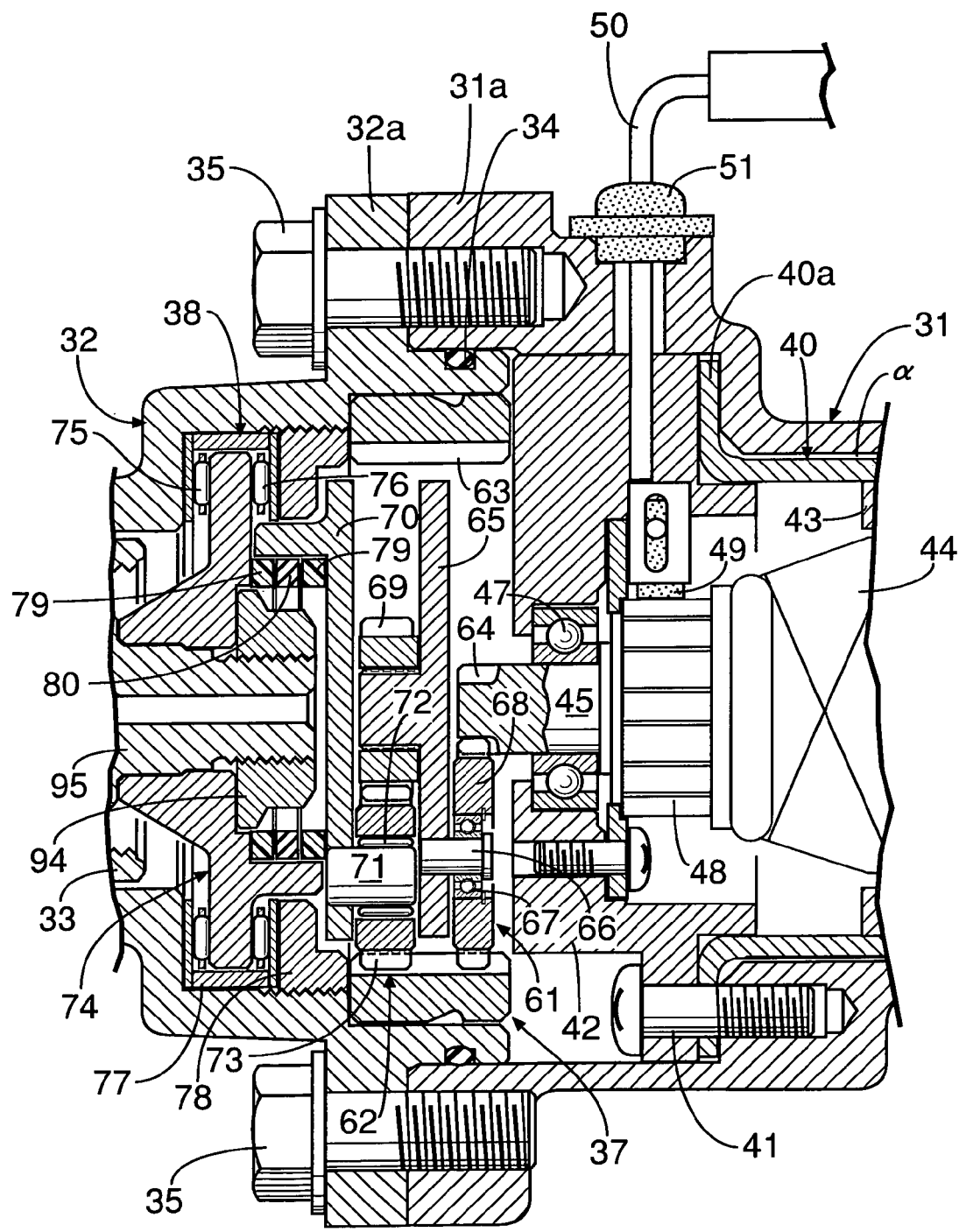
FIG. 4 is an enlarged view of area 4 in FIG. 3 (first embodiment).

As shown in FIGS. 3 and 4, the toe control actuator 14 includes a first housing 31 integrally provided with the rubber bush joint 20 connected to the vehicle body side, and a second housing 32 which expandably and contractably supports an output rod 33 integrally provided with the rubber bush joint 21 connected to the knuckle 11 side. Opposed portions of the first and second housings 31 and 32 are integrally connected to each other by fastening their coupling flanges 3 1a and 32a by a plurality of bolts 35 in a state in which the housings 31 and 32 are socket-fitted to each other with a seal member 34 interposed therebetween. A brushed motor 36 serving as a drive source is accommodated within the first housing 31, and a planetary gear-type decelerator 37, a coupling 38 having a resilience, and a feed screw mechanism 39 using a trapezoidal screw are accommodated within the second housing 32.

In this manner, the toe control actuator 14 is formed by previously sub-assembling the first housing 31 accommodating the motor 36 and the second housing 32 accommodating the decelerator 37, the coupling 38 and the feed screw mechanism 39 and coupling the first housing 31 and the second housing 32 to each other. Therefore, when the motor 36 is changed to a motor generating a larger output or a motor generating a smaller output, or when the operational characteristics of the decelerator 37 and the feed screw mechanism 39 are changed, this can be achieved by exchanging only a subassembly on the side of the first housing 31 or a subassembly on the side of the second housing 32 without changing the design of the entire toe control actuator 14. Thus, it is possible to enhance the general-purpose properties for various types, leading to a reduction in cost.

A contour of the motor 36 is formed from a yoke 40 formed into a cup-shape and having a flange 40a, and a bearing holder 42 fastened to the flange 40a of the yoke 40 by a plurality of bolts 41. The bolts 41 for fastening the yoke 40 and the bearing holder 42 are threadedly engaged with an end face of the first housing 31, and the motor 36 is fixed to the first housing 31 utilizing the bolts 41.

A rotor 44 disposed within an annular stator 43 supported on an inner peripheral surface of the yoke 40 has a rotary shaft 45 which is rotatably supported at one end thereon on a ball bearing 46 mounted on a bottom of the yoke 40 and is rotatably supported at the other end thereof on a ball bearing 47 mounted on the bearing holder 42. A brush 49 is supported on an inner surface of the bearing holder 42 to come into sliding contact with a commutator 48 mounted around an outer periphery of the rotary shaft 45. A wiring 50 extending from the brush 49 is drawn out to the outside through a grommet 51 mounted on the first housing 31.

The contour of the motor 36 is formed from the yoke 40 which is a firm part having the stator 43 and the rotor 44 accommodated therein, and the yoke 40 is fixed to the first housing 31. Therefore, a load input to the toe control actuator 14 from the rear wheel W is received by the first housing 31, so that such load is hard to be applied to the motor 36; and thus, it is possible to enhance the durability and reliability of the motor 36. Moreover, a clearance α is formed between the outer peripheral surface of the yoke 40 of the motor 36 and the inner peripheral surface of the first housing 31. Therefore, it is possible not only to inhibit the leakage of a operating sound of the motor 36 to the outside of the first housing 31 by the clearance α, but also to further reliably prevent an external force applied to the first housing 31 from being transmitted to the motor 36.

In addition, the motor 36 is fixed to the first housing 31 utilizing the bolts 41 for integrally fastening the yoke 40 of the motor 36 and the bearing holder 42. Therefore, as compared with a case where the motor 36 is fixed to the first housing 31 by bolts other than the bolts 41, it is possible not only to reduce the number of the bolts, but also to reduce a space for disposition of the other bolts, leading to a reduction in size of the toe control actuator 14.

Figure 5:
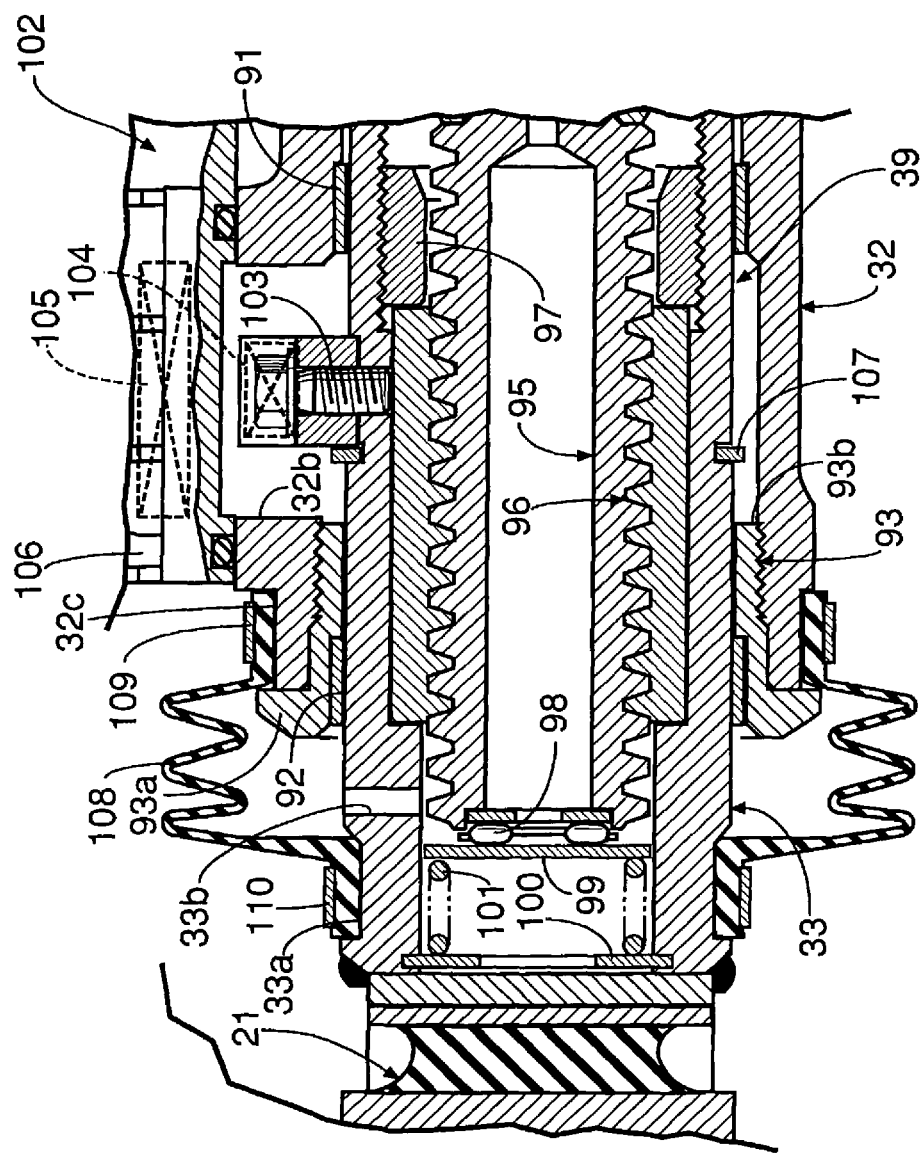
FIG. 5 is an enlarged view of area 5 in FIG. 3 (first embodiment).

As shown in FIGS. 4 and 5, the decelerator 37 is formed by coupling a first planetary gear mechanism 61 and a second planetary gear mechanism 62 in two stages. The first planetary gear mechanism 61 is formed from a ring gear 63 fitted into and fixed in an opening in the second housing 32, a first sun gear 64 formed directly at a leading end of the rotary shaft 45 of the motor 36, a disk-shaped first carrier 65, and four first pinions 68 which are rotatably carried on first pinion pins 66 supported in a cantilever manner by press-fitting into the first carrier 65 with ball bearings 67 interposed therebetween, and which are simultaneously meshed with the ring gear 63 and the first sun gear 64. The first planetary gear mechanism 61 decelerates and transmits the rotation of the first sun gear 64 which is an input member to the first carrier 65 which is an output member.

The second planetary gear mechanism 62 of the decelerator 37 is formed from the ring gear 63 common to the first planetary gear mechanism 61, a second sun gear 69 fixed to the center of the first carrier 65, a disk-shaped second carrier 70, and four second pinions 73 which are rotatably carried on second pinion pins 71 supported in a cantilever manner by press-fitting into the second carrier 70 with slide bushes 72 interposed therebetween, and which are simultaneously meshed with the ring gear 63 and the second sun gear 69. The second planetary gear mechanism 62 decelerates and transmits the rotation of the second sun gear 69 which is an input member to the second carrier 70 which is an output member.

In this manner, a large decoration ratio can be obtained by connecting the first and second planetary gear mechanisms 61 and 62 in series, and moreover, it is possible to reduce the size of the decelerator 37. In addition, the sun gear 64 of the first planetary gear mechanism 61 is formed directly on the rotary shaft 45 without being fixed to the rotary shaft 45 of the motor 36. Therefore, as compared with a case where a first sun gear 64 mounted separately from the rotary shaft 45 is employed, it is possible not only to reduce the number of parts, but also to suppress the diameter of the first sun gear 64 to the minimum and to set the deceleration ratio of the first planetary gear mechanism 61 at a large value.

The second carrier 70 which is the output member of the decelerator 37 is connected to an input flange 74 which is an input member of the feed screw mechanism 39 through the coupling 38. The input flange 74 which is generally disk-shaped is rotatably supported with its outer peripheral portion sandwiched between a pair of thrust bearings 75 and 76. More specifically, an annular locking nut 78 is fastened to the inner peripheral surface of the second housing 32 so as to sandwich a spacer collar 77 between them. One of the thrust bearings 75 is disposed to support a thrust load between the second housing 32 and the input flange 74, and the other thrust bearing 76 is disposed to support a thrust load between the locking nut 78 and the input flange 74.

Figure 6:
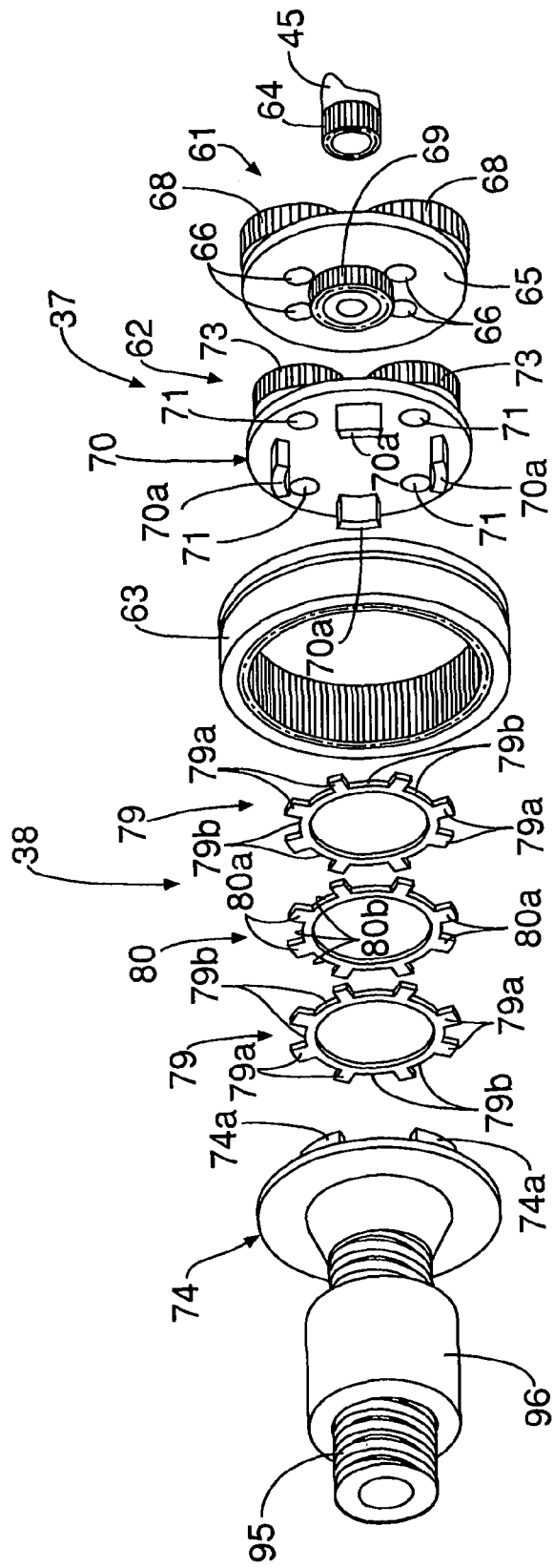
FIG. 6 is an exploded perspective view of a decelerator and a coupling (first embodiment).
Figure 7:
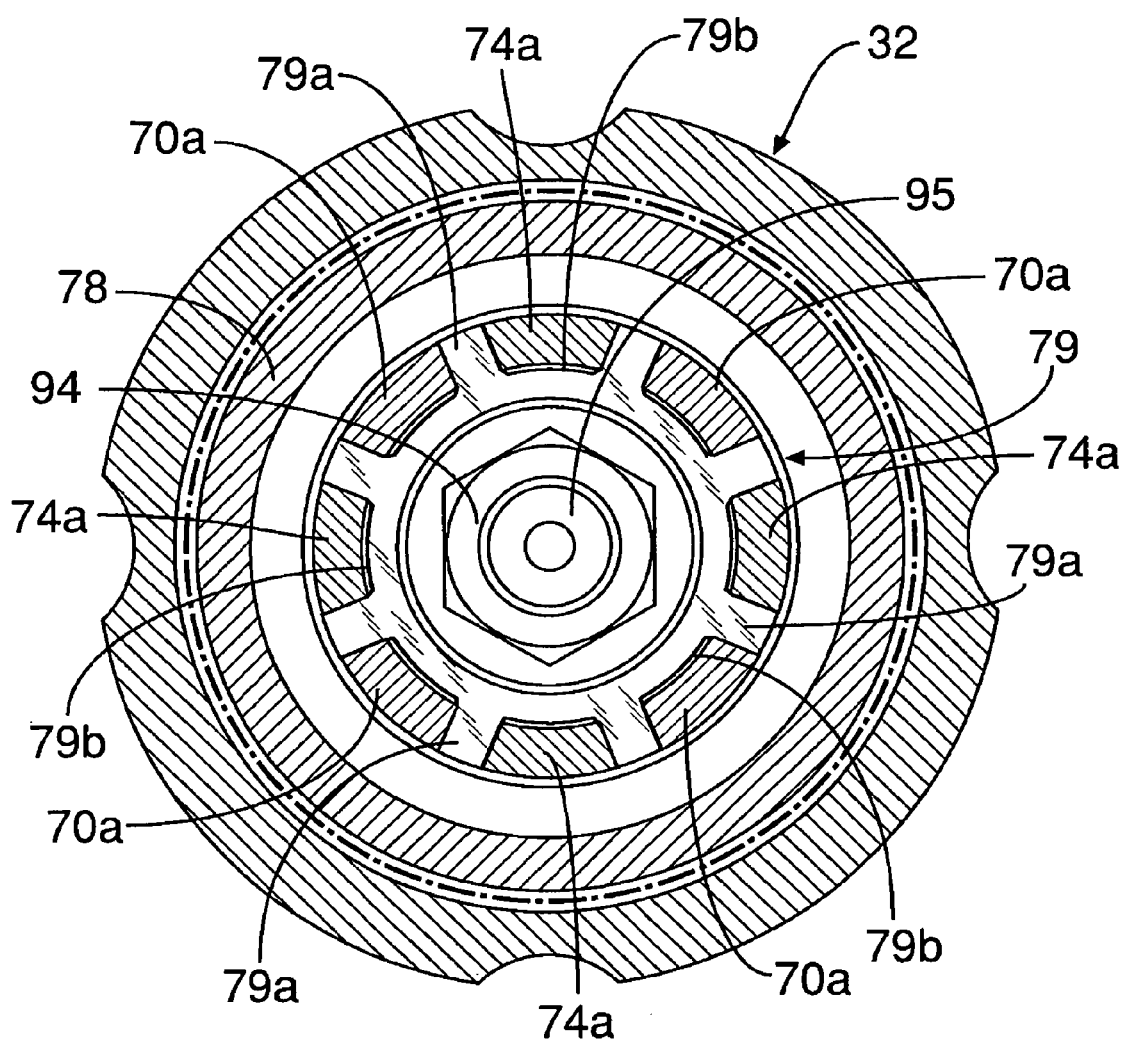
FIG. 7 is an enlarged sectional view along line 7-7 in FIG. 3 (first embodiment).

As can be seen from FIGS. 4, 6 and 7, the coupling 38 includes two outer elastic bushes 79, 79 formed of, for example, a polyacetal, a single inner elastic bush 80 formed of, for example, a silicone rubber. Eight projections 79a, 80a and eight grooves 79b, 80b are formed projectingly and radially at equal distances around each of outer peripheries of the bushes 79, 79 and 80. On the other hand, four claws 70a and four claws 74a are projectingly formed at equal distances on opposed surfaces of the second carrier 70 and the input flange 74 respectively to axially face each other.

The outer elastic bushes 79, 79 and the inner elastic bush 80 are superposed on each other, so that phases of the projections 79a and 80a are matched to each other; and the four claws 70a of the second carrier 70 are brought into engagement with alternate four of the eight grooves 79b, 80b, and the four claws 74a of the input flange 74 are brought into engagement with remaining four of the eight grooves 79b, 80b.

Therefore, a torque of the second carrier 70 is transmitted from the claws 70a of the second carrier 70 to the input flange 74 through the projections 79a and 80a of the outer elastic bushes 79, 79 and the inner elastic bush 80 and the claws 74a of the input flange 74. At this time, the outer elastic bushes 79, 79 and the inner elastic bush 80 formed of an elastomer exhibit an automatic aligning function for absorbing a very small axis-misalignment between the second carrier 70 and the input flange 74, and absorb a sudden change in torque to enable the smooth transmission of a power.

As can be seen from FIG. 5, a first slide bearing 91 is fixed to an inner peripheral surface of an axially intermediate portion of the second housing 32, while a second slide bearing 92 is fixed to an inner peripheral surface of an end member 93 threadedly engaged with an axial end of the first housing 32, and the output rod 33 is slidably supported on the first and second slide bearings 91 and 92. The feed screw mechanism 39 for converting the rotational motion of the input flange 74 to a thrust motion of the output rod 33 includes an externally threaded member 95 fastened by a nut 94 (see FIG. 4) penetrating the center of the input flange 74, and an internally threaded member 96 which is fixed in such a manner that it is threadedly meshed with an outer periphery of the externally threaded member 95 and it is fitted and fixed by a locking nut 97 to an inner peripheral surface of the hollow output rod 33.

In this way, the output rod 33 is supported on the second housing 32 with the plurality of (two in the embodiment) slide bearings 91 and 92 interposed therebetween. Therefore, a diametrical load applied to the output rod 33 can be reliably supported by the second housing 32 to prevent the gouging of the feed screw mechanism 39.

A coil spring 101 is provided in a compressed state between a spring seat 99 supported via a thrust bearing 98 on the extremity of the externally threaded member 95 and a spring seat 100 provided at the extremity of the output rod 33. The resilient force of this coil spring 101 urges the internally threaded member 96 fixed to the output rod 33 and the externally threaded member 95 screwed into the internally threaded member 96 in opposite directions to each other, thus functioning so as to eliminate rattling between the thread of the externally threaded member 95 and the thread of the internally threaded member 96.

This enables the thread of the externally threaded member 95 to always be in intimate contact with the thread of the internally threaded member 96, thereby generating a frictional force, and it is possible to prevent the externally threaded member 95 from rotating of its own accord and the toe angle of the rear wheel W from changing when a vibrational load is inputted from the rear wheel W side into the internally threaded member 96 or a large load is inputted from the rear wheel W side into the internally threaded member 96, thereby improving the precision of control of the toe angle. As a result, it becomes unnecessary to suppress unintentional rotation of the externally threaded member 95 by passing current to the motor 36, and the power consumption of the motor 36 is reduced.

A stroke sensor 102 mounted on the second housing 32 to detect a stroke position of the output rod 33 to feed it back to a control device when controlling the toe control actuator 14 for expansion and contraction includes a detected portion 104 formed from a permanent magnet fixed to the outer peripheral surface of the output rod 33 by a bolt 103, and a sensor body 106 in which detecting portion 105 such as a coil for magnetically detecting the position of the detected portion 104 is accommodated. An axially extending opening 32b is formed in the second housing 32 to avoid that the detected portion 104 interferes with the movement of the output rod 33.

An annular stopper 107 is mounted around the outer periphery of the output rod 33 and abuts against an abutment surface 93b of the end member 93 when the output rod 33 has been moved in an expanding direction to a limit position. The provision of the stopper 107 ensures that even if the motor 36 is overdriven due to any abnormality, the output rod 33 can be reliably prevented from being dropped off from the second housing 32. In addition, the stopper 107 is disposed utilizing a dead space sandwiched between the first and second slide bearings 91 and 92, and hence, it is possible to reduce the space. Moreover, the second slide bearing 92 is mounted on the end member 93 capable of being separated from the second housing 32 and hence, the output rod 33 having the stopper 107 can be attached to and detached from the second housing 32 without being obstructed by the second slide bearing 92.

In order to prevent the entrance of water and dust into a clearance between the second housing 32 and the output rod 33, opposite ends of a boot 108 are fitted over an annular step 32c formed on the second housing 32 and into an annular groove 33a formed in the output rod 33 and fixed by bands 109 and 110, respectively. At this time, the annular step 32c of the second housing 32 and a flange 93a of the end member 93 cooperate to form an annular groove and hence, it is possible to prevent the drop-off of one end of the boot 108 fixed by the band 109. In addition, the drop-off of the boot 108 is prevented utilizing the flange 93a of the end member 93 and hence, it is only required to provide the annular step 32c without provision of an annular groove in the second housing 32 and thus, the processing or working is easy as compared with a case where an annular groove is formed. Moreover, the annular step 32c having only one shoulder rather than the annular groove having two shoulders is reduced in width and hence, the axial dimension of the second housing 32 can be correspondingly reduced.

When the output rod 33 is expanded, the volumes of the internal spaces in the first and second housings 31 and 32 are increased. On the other hand, when the output rod 33 is contracted, the volumes of the internal spaces in the first and second housings 31 and 32 are decreased. Therefore, there is a risk that the pressure in each of the internal spaces is varied to impede the smooth operation of the toe control actuator 14. However, the internal space in the hollow output rod 33 and the internal space in the boot 108 communicate with each other through a ventilation bore 33b formed in the output rod 33 and therefore, the variation in pressure is moderated by the deformation of the boot 108 to enable the smooth operation of the toe control actuator 14.

As shown in FIG. 2, the left and right toe control actuators 14, 14 have structures that are mirror-symmetric relative to a central plane P of the vehicle body; identical components are used for the left and right first housings 31, 31, and identical components are also used for the left and right second housings 32, 32, thus reducing the number of components.

Figure 8:
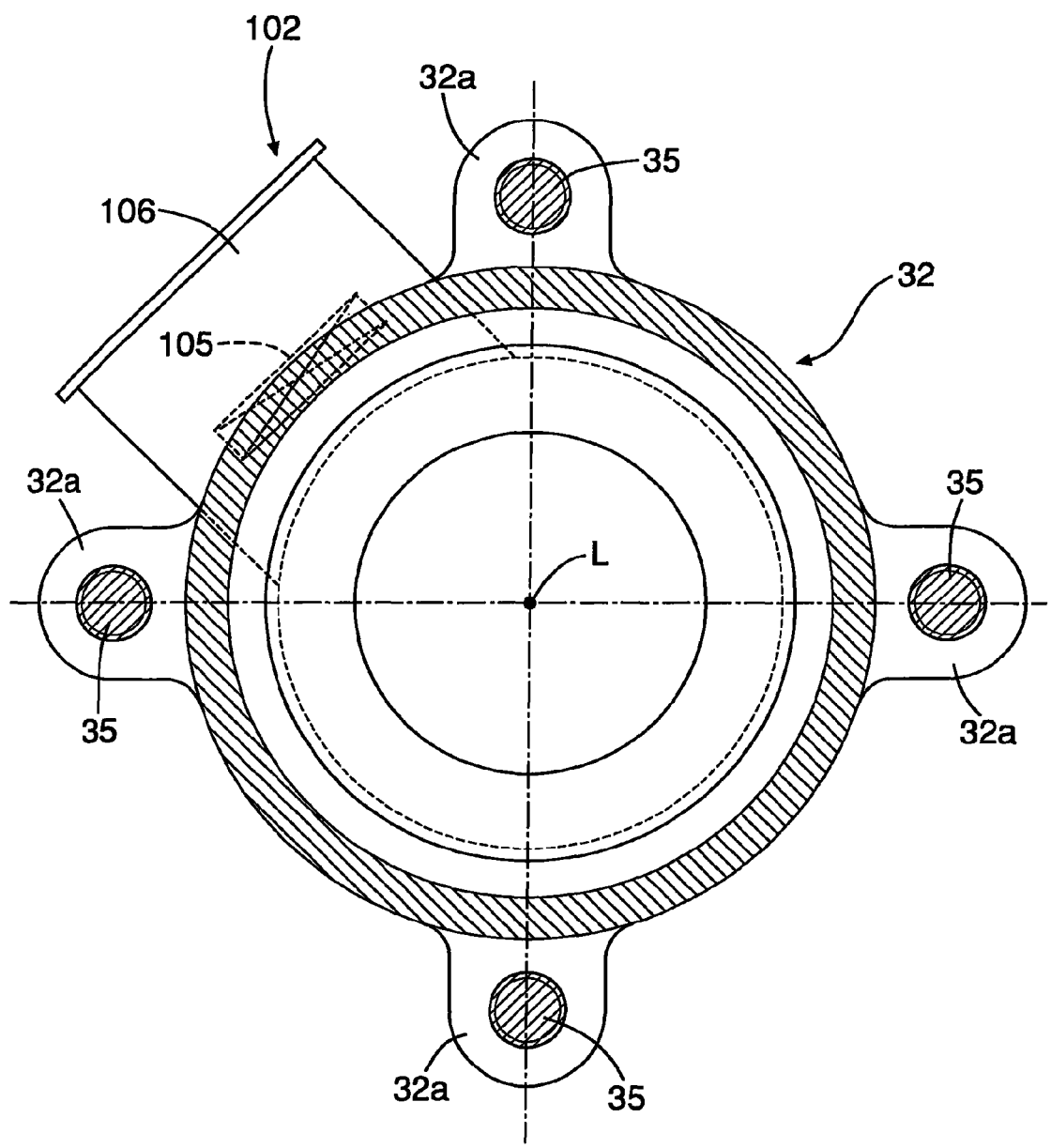
FIG. 8 is a sectional view along line 8-8 in FIG. 3 (first embodiment).

As shown in FIG. 8, the four bolts 35 fixing the four coupling flanges 32a of the second housing 32 to the four coupling flanges 31a of the first housing 31 are disposed at equal intervals of 90° with the axis L as the center. The first and second housings 31 and 32 can therefore be connected at positions that are rotated around the axis L through 90°, 180°, or 270°. A stroke sensor 102 provided on the second housing 32 is disposed in an intermediate section between two adjacent bolts 35, 35.

Figure 9:
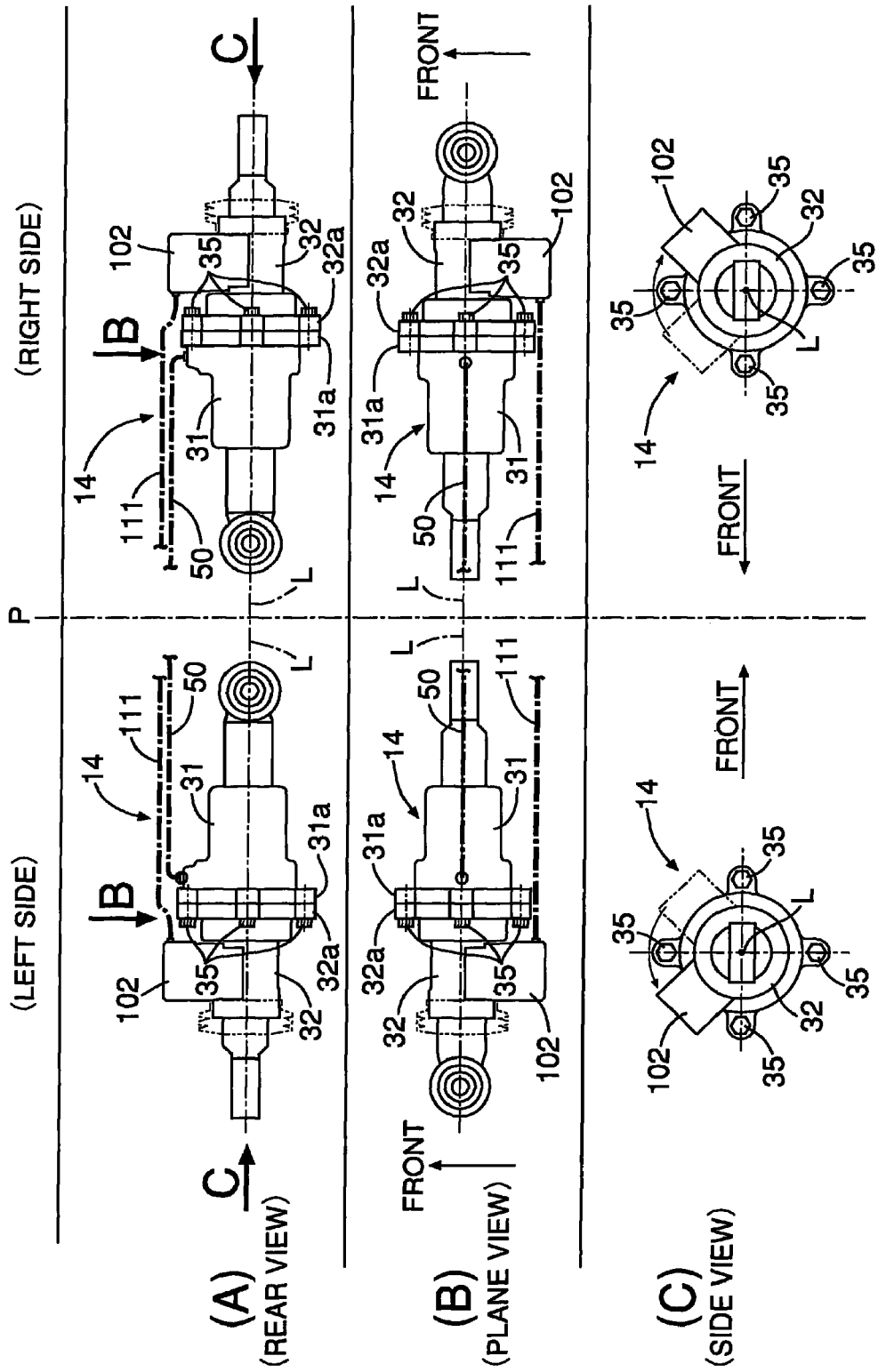
FIG. 9 is a diagram for explaining the operation of the embodiment (first embodiment).

As shown in FIG. 9 (A) and FIG. 9 (B), the first housings 31, 31, which are on the inside in the vehicle width direction of the left and right toe control actuators 14, 14, are interchangeable identical members, and wirings 50, 50 connected to the motors 36, 36 extends inward in the vehicle width direction from upper faces of the first housings 31, 31. The stroke sensors 102, 102 provided on the second housings 32, 32, which are on the outside in the vehicle width direction of the left and right toe control actuators 14, 14, are positioned to the upper and rear side of the vehicle body. Therefore, if for example the right-hand side toe control actuator 14 is used as the left-hand side toe control actuator 14 as it is, the stroke sensor 102 of the second housing 32 is not positioned to the upper and rear side of the vehicle body but is instead positioned to the upper and front side of the vehicle body, and the left and right toe control actuators 14, 14 do not have a mirror-symmetric relationship relative to the central plane P of the vehicle body.

However, in accordance with the present embodiment, if for example the second housing 32 is fixed in a state in which it has been rotated around the axis L by 90° relative to the first housing 31 of the right-hand side toe control actuator 14, and this is used as the left-hand side toe control actuator 14, as shown in FIG. 9 (C), while using the second housings 32, 32 in common for the left and right toe control actuators 14, 14, the left and right toe control actuators 14, 14 can be disposed mirror-symmetrically relative to the central plane P of the vehicle body. As a result, it is possible to realize a compact arrangement by bringing out wirings 111, 111 symmetrically, which extend from the left and right stroke sensors 102, 102, inwardly in the vehicle width direction while avoiding interference with another member.

Although an embodiment of the present invention has been described in detail, it will be understood that the present invention is not limited to the above-described embodiment, and various modifications in design may be made without departing from the scope of the invention defined in claims.

For example, the application of the actuator for a vehicle according to the present invention is not limited to the toe control actuator 14 described in the embodiment, and the actuator for a vehicle according to the present invention can be utilized in any application.

Furthermore, the component of the present invention is not limited to the stroke sensors 102 and 102 of the embodiment.

Moreover, in the embodiment the first and second housings 31 and 32 are connected via the four bolts 35, but the number of bolts 35 is not limited to four and may be any plurality of 2, 3, 5, or more. However, it is necessary to arrange the plurality of bolts 35 at equal intervals in the circumferential direction.

Furthermore, in the embodiment the stroke sensor 102 is disposed at an intermediate position between two adjacent bolts 35, 35, but the same operational effects can be achieved by disposing it at a position of any one bolt 35.

Moreover, in the embodiment the first housings 31 are used in common for the left and right toe control actuators 14, 14, but they may be formed as different components for the left and right.

The invention claimed is:

1. An actuator for a vehicle, comprising a right actuator disposed on a right-hand side of the vehicle and a left actuator disposed on a left-hand side of the vehicle, each of the actuators comprising a first housing and a second housing connected in a direction of an axis and having mutually opposed end faces, and a coupling flange formed on the end face of the first housing and a coupling flange formed on the end face of the second housing being connected by a plurality of bolts disposed on a circumference having the axis as the center, wherein the plurality of bolts are disposed at equal intervals in the circumferential direction, and at least one of the first and second housings comprises a component mounting part having a component mounted thereon at an intermediate position between two bolts of the plurality of bolts or at a position of any one bolt, and wherein the respective first and second housings of the right and left actuator are fixed to each other in different rotational positions around the axis such that the right and left actuators together with the respective mounted component are disposed mirror-symmetrically relative to a central plane of the vehicle.

2. The actuator for a vehicle according to claim 1, wherein the left and right actuators are expandable actuators forming suspension arms of the vehicle, and a wiring of the component extends from the component inward in a vehicle width direction.

* * * * *